United States Patent [19]

Ditlinger

[11] Patent Number: 5,118,119
[45] Date of Patent: Jun. 2, 1992

[54] HIGH TEMPERATURE AND HIGH PRESSURE SEAL RETAINER RING

[75] Inventor: Richard J. Ditlinger, South Bend, Ind.

[73] Assignee: Allied-Signal Inc., Morristown, N.J.

[21] Appl. No.: 736,889

[22] Filed: Jul. 29, 1991

[51] Int. Cl.⁵ .................................................. F16S 9/00
[52] U.S. Cl. ........................................ 277/170; 92/250; 92/259; 277/9; 277/177; 277/188 R
[58] Field of Search ............... 277/9, 168, 170, 177, 277/188 R, 188 A; 92/248, 250, 251, 252, 256, 259

[56] References Cited

U.S. PATENT DOCUMENTS

| | | |
|---|---|---|
| 2,462,586 | 2/1949 | Whittingham . |
| 3,146,683 | 9/1964 | Hoffmann ................. 277/188 R X |
| 3,259,392 | 7/1966 | Peickii et al. ................. 277/177 X |
| 3,362,720 | 1/1968 | Henry et al. ................. 277/188 R X |
| 3,366,392 | 1/1968 | Kennel ............................... 277/177 |
| 3,522,950 | 8/1970 | Schneck, Jr. ................. 277/188 R |
| 3,540,745 | 11/1970 | Fleck ............................... 277/188 |
| 4,169,605 | 10/1979 | Nishimoto et al. ................. 277/188 |
| 4,177,837 | 12/1979 | Frank et al. ................. 277/188 A X |
| 4,346,903 | 8/1982 | Heiermann . |
| 4,483,543 | 11/1984 | Fisher, Jr. et al. ................. 277/188 |
| 4,681,327 | 7/1987 | d'Agostino et al. . |

FOREIGN PATENT DOCUMENTS

| | | |
|---|---|---|
| 962298 | 4/1957 | Fed. Rep. of Germany ... 277/188 R |
| 2011019 | 9/1970 | Fed. Rep. of Germany . |
| 1297515 | 11/1962 | France . |
| 638164 | 5/1950 | United Kingdom ................ 277/170 |
| 933136 | 8/1963 | United Kingdom . |
| 1316841 | 5/1973 | United Kingdom ........... 277/188 A |

*Primary Examiner*—William A. Cuchlinski, Jr.
*Assistant Examiner*—Scott W. Cummings
*Attorney, Agent, or Firm*—Larry J. Palguta; Leo H. McCormick; Robert A. Walsh

[57] ABSTRACT

The high temperature and high pressure seal retainer ring (40) is a continuous ring (40) of polyetheretherketone having an inner diameter that is substantially equal to outer diameters of a rear portion of a movable piston (14). The ring (40) is generally wedge shaped and is received within a wedge shaped opening defined by a surface of a bore (12) receiving the movable piston (14) and a sloped axially extending surface (22) at the rear portion of the piston (14). The piston (14) includes a groove (18) adjacent the sloped axially extending surface (22) and receives therein a rubber seal (30).

4 Claims, 1 Drawing Sheet

HIGH TEMPERATURE AND HIGH PRESSURE SEAL RETAINER RING

The present invention relates generally to a high temperature and high pressure seal retainer ring, and in particular to a continuous seal retainer ring made of polyetheretherketone.

Conventional packing or seal retainers for military applications have proven inadequate at higher pressures and temperatures that exist in modern military aircraft, the inadequacy resulting from the cold flow or creep characteristics of polytetrafluoroethylene ("Teflon ®"). Retainers of a higher modulus plastic that do not experience cold flow have been used successfully in some limited applications. The complexity of the retainer and associated seals have limited the usage thereof. FIG. 1 illustrates a prior backup ring and seal configuration utilized for aircraft pistons wherein the piston rear lip 2 and front lip 6 define a groove in which is received a pair of polytetrafluoroethylene backup rings 3 about a rubber packing or seal 4. The entire structure comprising the piston front lip and rear lip, groove, rings and packing or seal comprises a sealing gland 5. Such a sealing gland is suitable for lower pressures and low modulus backup rings made of polytetrafluoroethylene can function properly. However, for higher pressure and higher temperature applications, polytetrafluoroethylene has a tendency to creep and, therefore, a split polyetheretherketone ("PEEK") ring has been utilized. Because the PEEK ring shown in FIG. 2 does not have the resiliency or flexibility of a polytetrafluoroethylene ring, the ring has to be split wherein the scarfed joint 8 permits the ring to be opened to a larger inner diameter so that it can fit over the rear piston lip 2. A problem created by the splitting of the PEEK ring is that the rubber packing 4 illustrated in FIG. 1 can be cut by the scarfed joint. In order to prevent the scarfed joint 8 of ring 7 from cutting the packing or seal 4 in FIG. 1, packing 4 must be separated from the scarfed joint 8 by either a buffer ring located between scarfed joint 8 of ring 7 and rubber packing 4 or by a method utilized by a seal assembly retainer known as the Shamban "Stakbak". In the Stakbak seal assembly retainer, an inner ring of polytetrafluoroethylene contacts the packing or seal in the unpressurized state. Not until the system is pressurized is the packing or seal contacted by an outer scarfed PEEK ring. While the Stakbak assembly is apparently successful, the retainer is complicated and expensive and the potential for cutting the packing still exists in the pressurized state.

The present invention provides solutions to the above problems by providing a PEEK or polyetheretherketone seal retainer ring which has a continuous diameter without any scarfed joint. The outer diameter of a groove at the rear of the piston is approximately equal to the outer diameter of the back portion of the front lip of the piston. This permits the PEEK ring to be continuous and installable with adequate retention of the packing. Thus, without a scarfed joint, the PEEK ring can be continuous and installed to be in direct contact with the packing or seal. Because of the shape of the PEEK ring, it can be installed only at one location and in one position thereby eliminating any possibility of improper assembly. The use of the PEEK ring of the present invention eliminates the use of a two ring assembly retainer (an inner ring of polytetrafluoroethylene and an outer ring of polyetheretherketone) as disclosed above.

The present invention provides solutions to the above problems by providing a high temperature and high pressure seal retainer ring in combination with a movable body disposed in a bore, the movable body including an annular radially extending groove receiving therein a seal, the body having at one axial side of the seal a groove lip which is disposed a radial distance outwardly from a bottom of said groove, and at the other axial side of said seal a groove lip having a sloped axially extending surface and including adjacent the seal a corner located at approximately said radial distance from said bottom of the groove, and a continuous seal retainer ring disposed between said sloped axially extending surface and a surface of said bore, the ring having at one radial side a sloped surface engaging the sloped axially extend surface and at the opposite radial side a substantially level surface engaging the surface of said bore. The ring being generally wedge shaped and being made of polyetheretherketone in order to withstand high temperature and high pressure.

One way of carrying out the invention is described in detail below with reference to the drawings which illustrate an embodiment in which.

Figure 1:
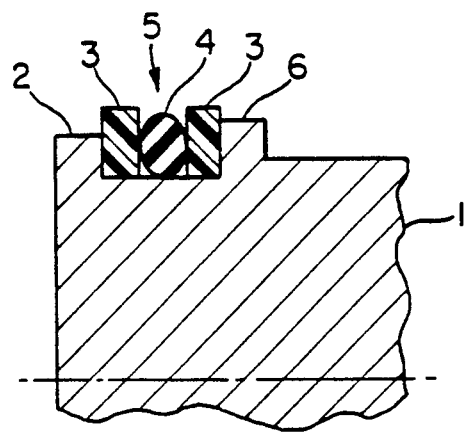
FIG. 1 is an illustration of a prior art gland.
Figure 2:
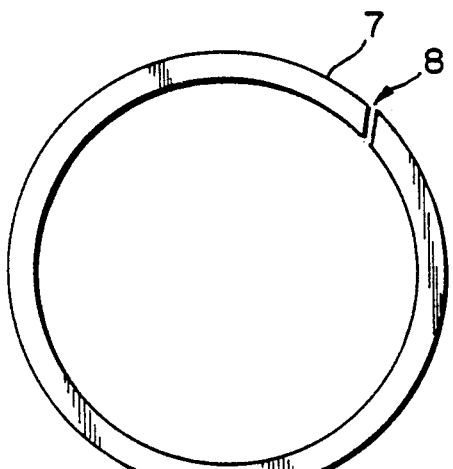
FIG. 2 is an illustration of a prior art PEEK ring with a scarfed joint.
Figure 3:
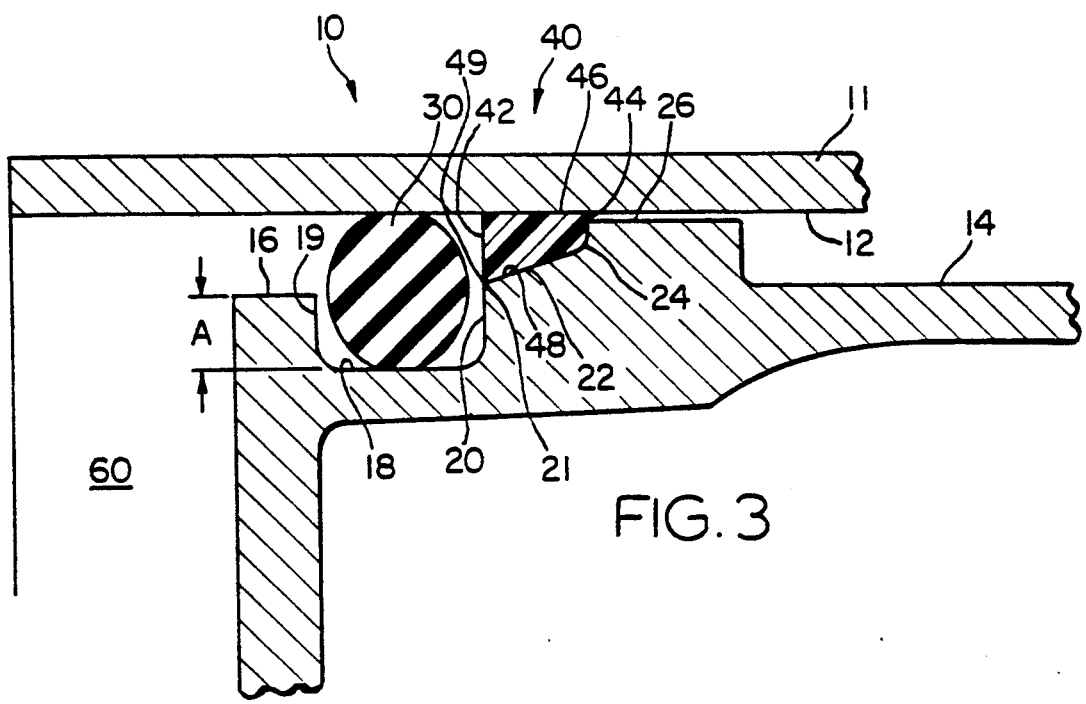
FIG. 3 illustrates the high temperature and high pressure seal retainer ring of the present invention.

The high temperature and high pressure seal retainer ring, packing or seal and movable body or piston groove all comprising a gland are designated generally by reference numeral 10 in FIG. 3. Body 11 includes bore 12 containing therein movable body 14 comprising a piston. Piston or movable body 14 includes rear lip 16 disposed at a radial distance A from the bottom of piston groove 18. Piston groove 18 includes rear radial wall 19 defining the distance A, and front radial wall 20 having a distance approximately equal to radial distance A. Front radial wall 20 terminates at corner 21 where sloped axially extending surface or front lip 22 begins. Front lip 22 extends to curved front 24 which extends radially outwardly to piston outer diameter surface 26. Located within groove 18 is a packing or seal 30 which engages the surface of bore 12.

The high temperature and high pressure seal retainer ring is designated generally by reference numeral 40 and comprises a rear substantially flat radial surface 42 opposite a front curved radial side 44. A level axially extending surface 46 engages the surface of bore 12 and is located opposite sloped or angled axial surface 48. Sloped surface 48 engages sloped axially extending surface 22 of movable piston 14. Ring 40 is made of polyetheretherketone ("PEEK") and is a continuous, nonsplit ring. Polyetheretherketone is a high modulus material which will withstand high temperature and pressure. The inner diameter of ring 40 located at ring corner 49 is substantially equal to the outer diameters of movable piston 14 located at the corner 21 and rear lip 16. Radial distance A (FIG. 3) terminates at approximately the radially outer end of radial wall 20 defined by corner 21, with these outer terminuses equaling the inner terminus of ring 40. Thus, the inner diameter of ring 40 and the outer diameters of movable piston 14 over which ring 40 must pass are substantially identical, permitting easy installation with minimal gap between the inner diameter of ring 40 and the outer terminus of radial wall 20. The tapered shape of ring 40 provides a mechanism which eliminates any gap at the interface of the inner diameter of ring 40 and front lip 22. As ring 40 is moved axially into place about surface 22. ring 40 fits snugly into place and eliminates any gap therebetween. When packing 30 experiences high-pressure fluid transmitted to or contained within chamber 60 at the rear of piston 14, an axial force is applied to ring surface 42, which pushes ring 40 up sloped surface 22 to expand the outer diameter of ring 40 and thus close any gap between bore 12 and piston outer diameter surface 26. This prevents extrusion of packing 30, because the gap is eliminated. The present invention has the potential of obsoleting prior high temperature and high pressure seal designs because of the ability of continuous retainer ring 40 to engage seal 30 without causing damaged thereto.

I claim:

1. A high temperature and high pressure seal retainer ring in combination with a movable body disposed in a bore, the movable body including an annular radially extending groove receiving therein a seal, the body having at one axial side of the seal a groove lip which is disposed a radial distance outwardly from a bottom of said groove, and at the other axial side of said seal a groove lip having a sloped axially extending surface and including adjacent the seal a corner located at approximately said radial distance from said bottom of the groove, and a continuous seal retainer ring disposed between said sloped axially extending surface and a surface of said bore, the ring having at one radial side a sloped surface engaging the sloped axially extending surface and at the opposite radial side a substantially level surface engaging the surface of said bore. the ring being generally wedge shaped and made of polyetheretherketone in order to withstand high temperature and high pressure.

2. The ring and body in accordance with claim 1, wherein said ring includes at one axial end a curved radial side which mates with a curved portion of said movable body.

3. The ring and body in accordance with claim 2, wherein an opposite axial end of said ring includes a substantially flat radial surface which is aligned axially with a radial side of said groove, said radial side comprising part of said corner.

4. The ring and body in accordance with claim 1, wherein the movable body comprises a movable piston and the groove, seal, and ring are disposed at a rear portion thereof.

* * * * *